`US008589000B2`

(12) United States Patent
Moffitt et al.

(10) Patent No.: US 8,589,000 B2
(45) Date of Patent: Nov. 19, 2013

(54) SYSTEM AND METHOD FOR REDUCING A PENALTY PERIOD FOR A VEHICLE

(75) Inventors: Robert Lyn Moffitt, Palm Bay, FL (US); Louis Cox, Satellite Beach, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/458,719

(22) Filed: Apr. 27, 2012

(65) Prior Publication Data

US 2013/0179048 A1    Jul. 11, 2013

Related U.S. Application Data

(63) Continuation of application No. 12/249,503, filed on Oct. 10, 2008, now Pat. No. 8,190,313.

(51) Int. Cl.
*B60T 17/00*    (2006.01)

(52) U.S. Cl.
USPC .............................. 701/19; 701/20; 303/128

(58) Field of Classification Search
USPC .......... 701/19, 20, 70; 303/128, 3, 14, 15, 16, 303/20
See application file for complete search history.

(56) References Cited

U.S. PATENT DOCUMENTS

| | | | |
|---|---|---|---|
| 4,626,039 A | 12/1986 | Worbois | |
| 4,971,398 A | 11/1990 | Ingalls | |
| 5,249,125 A * | 9/1993 | Root et al. | ...................... 701/70 |
| 5,412,572 A | 5/1995 | Root et al. | |
| 5,720,455 A | 2/1998 | Kull et al. | |
| 6,042,201 A * | 3/2000 | Marra et al. | .................. 303/128 |
| 6,275,165 B1 | 8/2001 | Bezos | |
| 6,371,575 B1 | 4/2002 | Lewis et al. | |
| 6,401,015 B1 | 6/2002 | Stewart et al. | |
| 6,435,623 B1 | 8/2002 | Peltz | |
| 6,759,951 B2 | 7/2004 | Kellner et al. | |
| 6,862,502 B2 | 3/2005 | Peltz et al. | |
| 7,395,141 B1 * | 7/2008 | Seck et al. | ...................... 701/19 |
| 2003/0107262 A1 | 6/2003 | Smith et al. | |
| 2005/0189815 A1 | 9/2005 | Bryant | |
| 2007/0236078 A1 | 10/2007 | Smith et al. | |

FOREIGN PATENT DOCUMENTS

| | | |
|---|---|---|
| EP | 0976633 | 2/2000 |
| WO | WO 02/053439 | 7/2002 |

OTHER PUBLICATIONS

ISR and Written Opinion of the International Searching Authority for International Application No. PCT/US2009/057643 dated Feb. 3, 2011.
Unofficial English translation of Office Action from EA dated Jun. 26, 2013.

* cited by examiner

*Primary Examiner* — Mark Le
(74) *Attorney, Agent, or Firm* — GE Global Patent Operation; John A. Kramer

(57) ABSTRACT

A system is provided for reducing a penalty period for a vehicle. The vehicle includes a braking system that switches into an application state upon commencement of the penalty period. The braking system includes a fluid carrying brake pipe which connects a first powered unit and a remote powered unit. The system includes a sensor positioned within the vehicle, which measures a parameter related to the operation of the braking system. A control processor is positioned within the first powered unit, and is coupled to the sensor. Subsequent to the commencement of the penalty period, the control processor monitors the measured parameter and switches the braking system from the application state into a release state to reduce the penalty period, based on the measured parameter falling within a predetermined safety range.

20 Claims, 2 Drawing Sheets

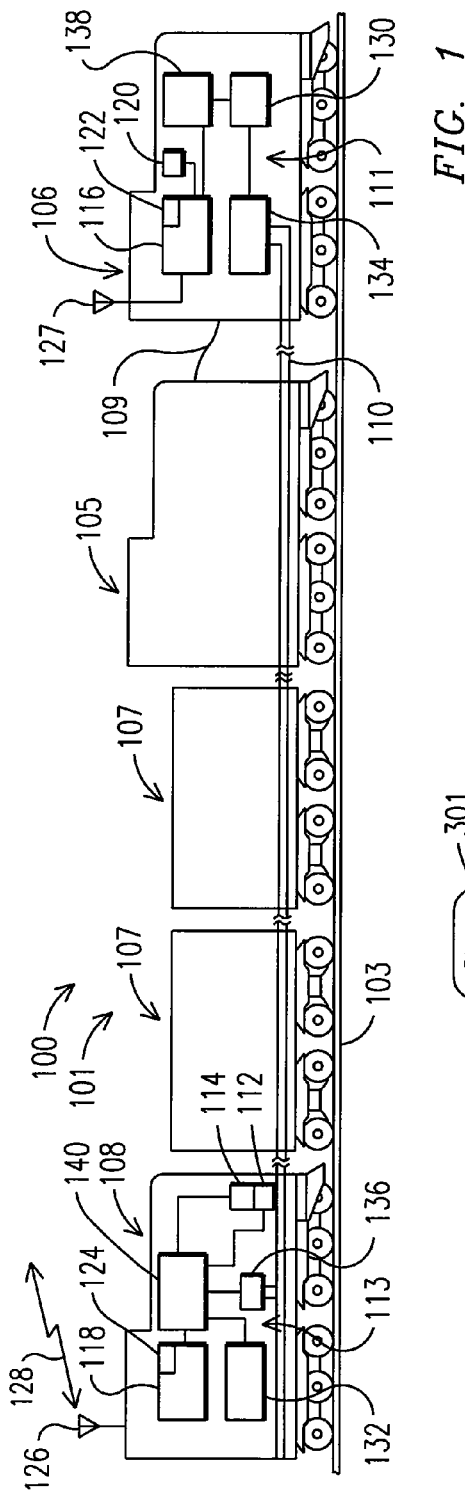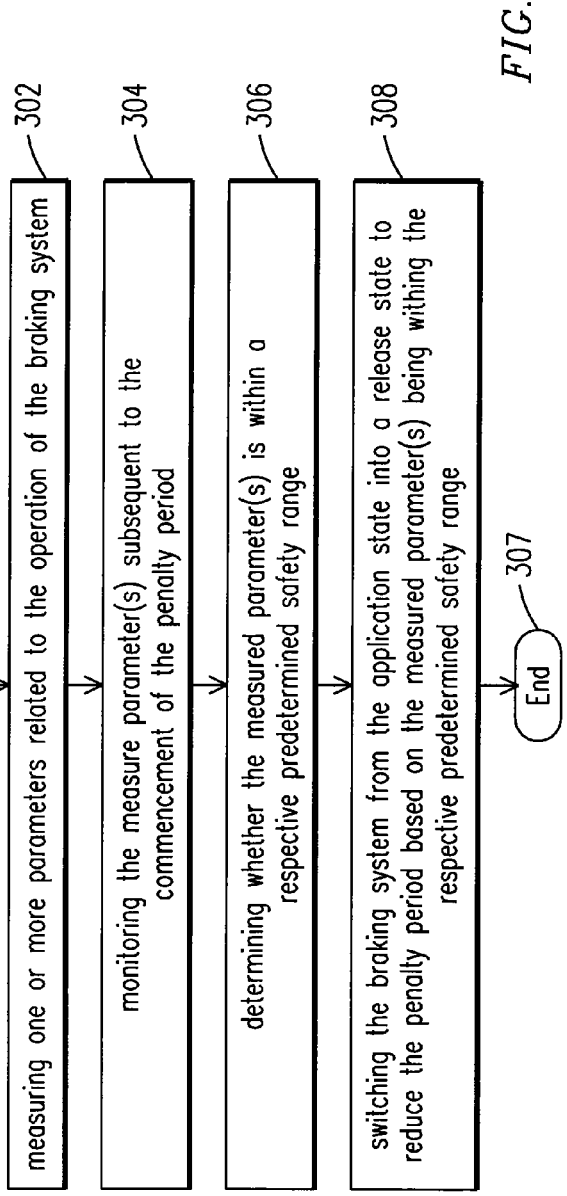

SYSTEM AND METHOD FOR REDUCING A PENALTY PERIOD FOR A VEHICLE

CROSS-REFERENCE TO RELATED APPLICATIONS

This application is a continuation of U.S. patent application Ser. No. 12/249,503, which was filed on 10 Oct. 2008 (the "'503 Application"). The entire disclosure of the '503 Application is incorporated by reference into this application.

BACKGROUND

Distributed power train operation involves the controlled coordination of motive power supplied from a lead locomotive and one or more remote locomotives spaced apart from the lead locomotive in a train consist. The lead and remote locomotives are linked together and controlled in concert to pull or otherwise move one or more non-powered load vehicles. Each lead and remote locomotive includes a braking processor for controlling the operations of a respective braking system and a communication system for exchanging information between the lead and remote locomotives over a communication link. A brake pipe fluidly interconnects each of the locomotives and rail cars of the train. Modulation of a fluid flow, such as the flow of a fluid in the brake pipe, is conventionally used to indicate or control desired braking operations. Remote locomotive braking operations may be controlled responsive to sensed brake pipe flow conditions at the respective remote locomotives.

During the operation of a distributed power train, various circumstances may trigger a "penalty brake" operation or application. Here, upon the occurrence of a designated stimulus, or based on certain operating conditions of the train (e.g., the train going over a designated speed limit, a determination that the train is in imminent threat of hitting another vehicle or other object, or the train passing a "stop" signal), a command is initiated for automatically causing the brake system of the train to engage. That is, based upon the occurrence of certain conditions, operation of the train is "penalized" by automatically causing the train to slow down and stop. The penalty brake application lasts at least a designated time period (commonly referred to as the "penalty period"), such as 120 seconds, during which the fluid pressure within the brake pipe is minimized, causing a full application of the braking system to stop the train for the penalty period. The penalty period may be arbitrarily set to ensure that the distributed power train has completely stopped prior to the end of the penalty period. The penalty period can be mandatory and may be enforced by an outside agency, such as the Federal Railroad Administration (FRA), for example. Thus, upon the occurrence of a circumstance giving rise to a penalty brake application, the distributed power train is automatically stopped for the penalty period, irrespective of whether adequate safety conditions are present to indicate that the train has completely stopped prior to the end of the penalty period.

Heretofore, the time length of a penalty period is mandatory (e.g., fixed) and introduces noticeable delays and inefficient operation of a distributed power train, particularly when multiple penalty periods are triggered in succession. Thus, it would be advantageous to provide a system which improves the efficient operation of a vehicle (such as a distributed power train) by verifying that adequate safety conditions are present to indicate that the vehicle has completely stopped by reducing the duration of a penalty period.

BRIEF DESCRIPTION

One embodiment of the presently described inventive subject matter provides a system for reducing a penalty period for a distributed power train. The distributed power train includes a braking system that switches into an application state upon the commencement of the penalty period. The distributed power train includes a first locomotive and a remote locomotive. The braking system includes a fluid carrying brake pipe that connects the first locomotive and the remote locomotive. The system includes a sensor positioned within the distributed power train, which measures a parameter related to the operation of the braking system. A control processor is positioned within the first locomotive, and is coupled to the sensor. Subsequent to the commencement of the penalty period, the control processor monitors the measured parameter and switches the braking system from the application state into a release state to reduce the penalty period, based on the measured parameter being within a predetermined safety range. (Here, the first locomotive may be a lead locomotive, but is not limited in this regard. Thus, "first" is an arbitrary designation for distinguishing the first locomotive from the remote locomotive or other vehicles, it being recognized that the functionality of the presently described inventive subject matter need not necessarily be embodied solely in a lead locomotive. "Remote" is also an arbitrary designation that refers to another locomotive other than the first locomotive. Thus, the remote locomotive may be contiguous with the first locomotive or separated there from by one or more other locomotives and/or non-locomotive rail cars.)

Another embodiment of the presently described inventive subject matter provides a system for reducing a penalty period for a distributed power train. The system includes the distributed power train having a first locomotive and a remote locomotive. Additionally, the system includes a braking system, which switches into an application state upon the commencement of the penalty period. The braking system includes a fluid carrying brake pipe that connects the first locomotive and the remote locomotive. The system further includes a sensor positioned within the distributed power train, to measure a parameter related to the operation of the braking system. Subsequent to the commencement of the penalty period, the braking system switches from the application state into a release state to reduce the penalty period, based on the measured parameter being within a predetermined safety range.

Another embodiment of the presently described inventive subject matter provides a method for reducing a penalty period for a distributed power train. The distributed power train includes a braking system, which switches into an application state upon commencement of the penalty period. The distributed power train includes a first locomotive and a remote locomotive. The braking system includes a fluid carrying brake pipe that connects the first locomotive and the remote locomotive. The method includes measuring a parameter related to the operation of the braking system, and monitoring the measured parameter subsequent to the commencement of the penalty period. Additionally, the method includes determining whether the measured parameter falls within a predetermined safety range. The method further includes switching the braking system from the application state into a release state to reduce the penalty period, based on the measured parameter falling within the predetermined safety range.

BRIEF DESCRIPTION OF THE DRAWINGS

FIG. 1 is a schematic diagram of a vehicle utilized in one embodiment of a system for reducing a penalty period of the vehicle;

FIG. 3 is a flow chart of one embodiment of a method for reducing a penalty period of the vehicle.

DETAILED DESCRIPTION

Figure 2:
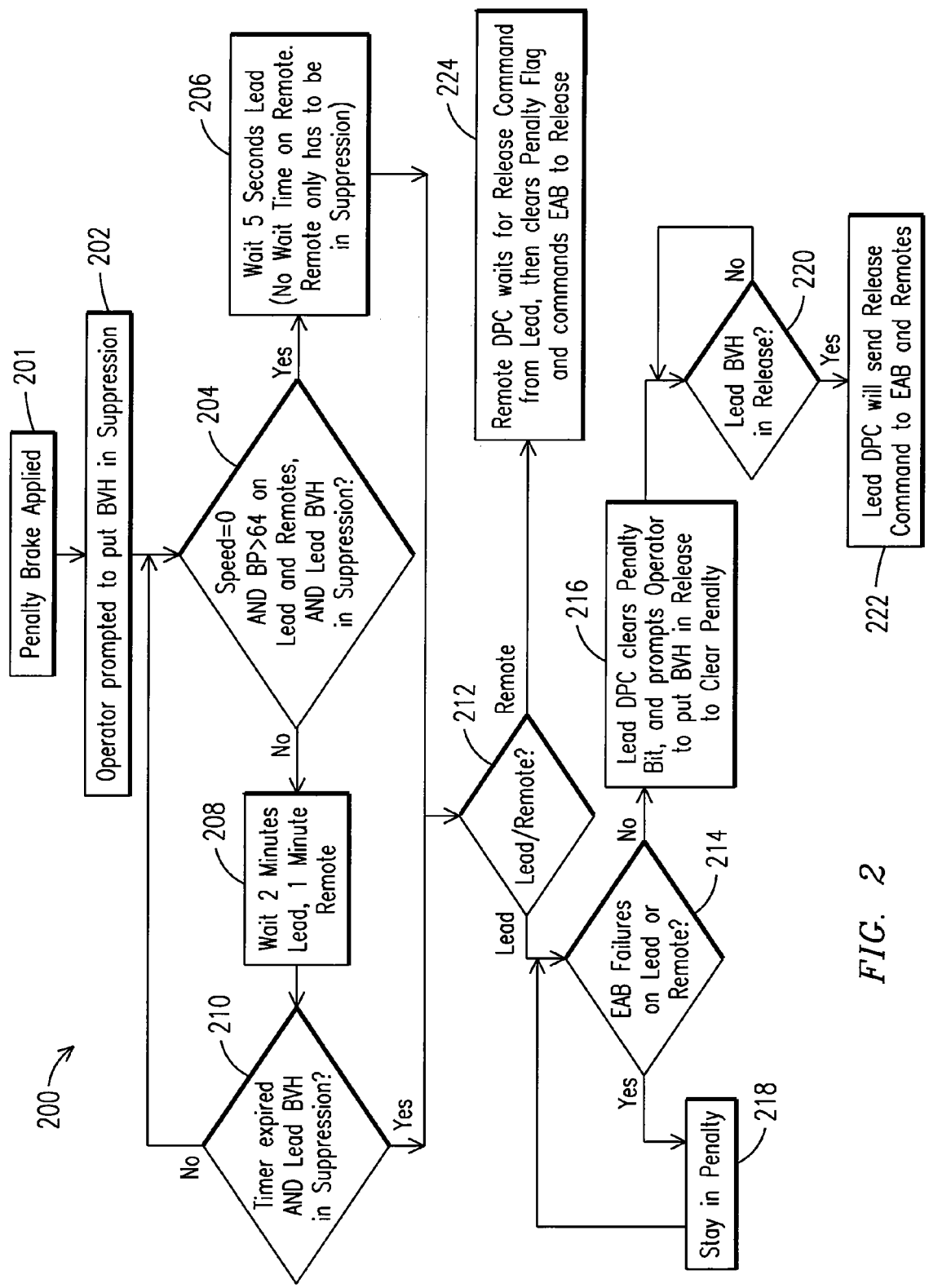
FIG. 2 is a flow chart of one embodiment of a method for reducing a penalty period of the vehicle.

During operations of vehicles, such as distributed power trains, noticeable delays and inefficiencies can be introduced during certain penalty brake applications, when braking systems of the vehicles are switched into a full or increased application state for a predetermined time period (e.g., a minimum penalty period), in an effort to ensure that the vehicle has stopped. In accordance with one embodiment of the presently described inventive subject matter, one or more monitored parameters related to or representative of operation of the braking system in the vehicle may be monitored to indicate whether the vehicle has stopped. The penalty period of the vehicle may be reduced by switching the braking system to a release state prior to the end of the penalty period if the monitored parameters indicate that the vehicle has stopped moving. The pressure within a brake pipe of the vehicle is an example of such a monitored parameter. A discussion of the measurement and monitoring of the brake pipe pressure within a distributed power train is discussed in U.S. Patent Publication No. 2007/0236078, filed on Apr. 10, 2006, and assigned to the assignee of the present application, which is incorporated by reference herein in its entirety. While the discussion of one or more embodiments described herein focuses on rail vehicles such as distributed power trains, at least one of the embodiments may relate to other types of vehicles, such as mining vehicles or other off highway vehicles, automobiles, and the like.

FIG. 1 illustrates one embodiment of a system 100 for reducing a penalty period for a vehicle 101 traveling along a route 103, such as a railroad, for example. The vehicle 101 is shown and described herein as a distributed power train, but alternatively may be another type of vehicle. The distributed power train 101 includes a pair of lead or other first powered units 105,106 (e.g., locomotives or other vehicles capable of self-propulsion), a remote powered unit 108 (e.g., a locomotive or other vehicle capable of self-propulsion), and non-powered units 107 (e.g., rail or train cars, or other vehicles that are not capable of self-propulsion) positioned between the lead powered units 105,106 and the remote powered unit 108. The lead powered units 105,106 may be communicatively coupled with cables 109 (e.g., trainline cables), for example. The lead powered unit 106 includes a lead braking system 111 and the remote powered unit 108 includes a remote braking system 113. The braking system 111, 113 includes a fluid carrying brake pipe 110, which extends the length of the vehicle 101, and connects the lead powered unit 106 and the remote powered unit 108. Although FIG. 1 illustrates a distributed power train having two lead locomotives and a single remote locomotive, this embodiment is merely one example of the inventive subject matter, and other embodiments of the presently described inventive subject matter may be applicable to other vehicles or rail vehicles, such as a distributed power train having a varied arrangement of lead locomotives and/or remote locomotives. Also, as indicated above, one or more embodiments of the presently described inventive subject matter are applicable to other distributed power trains having two or more locomotives, arbitrarily designated herein as a first locomotive and a remote locomotive. The first locomotive is shown and described herein as being the lead locomotive in the train, but this is for illustration purposes only and is not meant to be limiting, unless otherwise specified.

The braking systems 111, 113 can be switched to an application state upon a reduction in a pressure in the brake pipe 110 below an application pressure, such as 64 PSIG (pounds per square inch gauge), for example. The braking systems 111, 113 are switched to the release state upon an increase in the pressure in the brake pipe 110 above a release pressure, such as 90 PSIG, for example. For example, the braking systems 111, 113 may be switched from the release state to the application state by reducing the release pressure of 90 PSIG by 26 PSIG to below the application pressure of 64 PSIG. The numeric pressure thresholds discussed above in this example are examples only, and the exact numeric pressure thresholds of application or release of the braking systems 111, 113 may vary, based on the characteristics of the vehicle 101, for example.

During any of a number of penalty circumstances, the vehicle 101 initiates a penalty brake application or operation, which lasts at least a predetermined or designated penalty period, such as a minimum time period. In one embodiment, the penalty period may last for 120 seconds or other time period. During the penalty period, the braking systems 111, 113 are switched to the application state by lowering the pressure within the brake pipe 110 below the application pressure, such as below 64 PSIG, for example. For example, when the lead powered unit 106 and the remote powered unit 108 are linked through a communication link 128 (e.g., a wireless link) communicated through a respective transceiver 126,127 of the remote powered unit 108 and the lead powered unit 106, a penalty brake application may be automatically triggered and the brake pipe 110 pressure is lowered below the application pressure for the penalty period. Other examples of a penalty circumstance which may trigger a penalty period include a failure in a component or a system within the vehicle 101 and/or a speed of the vehicle 101 exceeding a predetermined or designated speed threshold, as measured by a wayside device (not shown) adjacent to the route 103, for example. Numerous other examples of penalty circumstances exist, all of which can involve a mandatory reduction in the brake pipe 110 pressure below the application pressure for the penalty period.

As further illustrated in the embodiment of FIG. 1, the system 100 can include sensors 112, 114 positioned within the vehicle 101 to measure a parameter related to the operation of the respective braking system 111, 113. For example, a fluid pressure sensor 112 can be coupled to the brake pipe 110 adjacent to the remote powered unit 108, to measure a pressure within the brake pipe 110 adjacent to the remote powered unit 108. Additionally, a speed sensor 114 can be positioned on the vehicle 101, such as on the remote powered unit 108, to measure a speed of the vehicle 101. One example of such a speed sensor may be an axle counter, which counts the number of rotations of the wheels of a powered unit, and, based on a known circumference of the wheels, can calculate the speed of the powered unit. In addition to being used for communicating with one another over the communication link 128, the transceivers 126, 127 may be global positioning system (GPS) transceivers which are in communication with GPS satellites (not shown), to determine a location of the respective remote powered unit 108 and the lead powered unit 106. The speed sensor may be a GPS speed sensor that is coupled to the GPS transceiver 126, and determines the speed of the vehicle 101, based on the position information provided by the GPS transceiver 126 and time data provided by a clock, for example. The sensors 112,114 are coupled to a remote processor 118, positioned on the remote powered unit 108. Although FIG. 1 illustrates one pressure sensor and one speed sensor, each of which are positioned on the remote powered unit, the embodiments of the presently described inventive subject matter are applicable for more than one pressure sensor and/or speed sensor, which may be positioned at a location other than the remote powered unit, for example.

As further illustrated in the exemplary embodiment of FIG. 1, the system 100 includes a lead processor 116 positioned within the lead powered unit 106. ("Lead" processor refers to a processor in a lead powered unit, but this is merely an example. As mentioned above, embodiments are applicable, more generally, to a control processor in a first powered unit, that is, a processor configured to carry out one or more control functions of the first powered unit or vehicle 101. The processor may be specific to the braking system, specific to the penalty period reduction system, or it may be a processor used in the powered unit/vehicle for multiple purposes.) The lead processor 116 is coupled to the pressure sensor 112 and/or the speed sensor 114 (via the wireless link 128 to the remote processor 118), and receives the measured pressure and/or speed data from the pressure sensor 112 and/or the speed sensor 114. Subsequent to a penalty circumstance, such as the linking between the lead powered unit 106 and the remote powered unit 108, as discussed above, and the commencement of the penalty period, the lead processor 116 is configured to monitor the measured pressure of the brake pipe 110 and/or measured speed of the vehicle 101. Based on the measured pressure in the brake pipe 110 and/or the measured speed of the vehicle 101, the lead processor 116 is configured to switch the braking system 111, 113 from the application state into a release state, and reduce the penalty period during which the application pressure in the brake pipe 110 is imposed. Thus, the vehicle 101 need not remain stationary with the braking systems 111, 113 in the application state for the entire penalty period, thereby reducing delays and improving the efficient operation of the vehicle 101.

As illustrated in the exemplary embodiment of FIG. 1, the lead powered unit 106 includes a display 120 coupled to the lead processor 116. The display 120 is configured to output the measured pressure within the brake pipe 110 and the measured speed of the vehicle 101. The lead processor 116 includes a memory 122 to store a respective predetermined safety range of the measured pressure within the brake pipe 110, and a respective predetermined safety range of the measured speed of the vehicle 101. The lead processor 116 monitors the measured pressure within the brake pipe 110 adjacent to the remote powered unit 108 and the measured speed of the vehicle 101, and determines whether the measured pressure and/or the measured speed are within the respective predetermined safety range of the measured pressure and the measured speed, provided by the memory 122. Subsequent to determining that the measured pressure and/or the measured speed are within the respective predetermined safety range, the lead processor 116 may transmit an output to the display 120 to prompt an operator of the lead powered unit 106 to switch the braking system 111 from the application state to the release state, as discussed in greater detail below. In an exemplary embodiment, the predetermined safety range of the measured pressure may be a pressure below the application pressure, such as a pressure below 64 PSIG, for example. In another exemplary embodiment, the predetermined safety range of the measured speed may be a speed below a low speed threshold that approaches or equals zero, as indicative that the vehicle 101 has actually stopped, for example.

As further illustrated in FIG. 1, the remote processor 118 is communicatively coupled to the lead processor 116 over the wireless link 128. (The remote powered unit 108 may include a memory unit 124 associated with the processor 118.) The respective braking system 111, 113 of the lead powered unit 106 and the remote powered unit 108 include a respective brake handle 130,132, a respective brake valve 134, 136, and a respective brake processor 138, 140 coupled to the respective brake handle 130, 132 and the respective brake valve 134, 136. Subsequent to the commencement of the penalty phase, the respective brake processor 138, 140 moves the respective brake handle 130, 132 to a suppression position and switches the respective brake valve 134, 136 to a closed position. As discussed above, subsequent to the commencement of the penalty phase, the pressure within the brake pipe 110 is reduced below an application value, such as below 64 PSIG, and the respective brake processor 138, 140 moves the respective brake handle 130, 132 to the suppression position and switches the respective brake valve 134, 136 to the closed position, in response thereto.

Subsequent to determining that the measured pressure and/or the measured speed falls within the respective predetermined safety range, the lead processor 116 may transmit one or more of: a lead valve signal to the brake processor 138 of the lead powered unit 106 to move the brake valve 134 from the closed position to an open position; a signal to the display 120 to prompt the operator of the vehicle 101 to switch the brake handle 130 from the suppression position to the release position; and/or a first release signal to the brake processor 138 of the lead powered unit 106 such that the braking system 111 of the lead powered unit 106 switches from the application state to the release state to initiate an increase in the pressure within the brake pipe 110. Subsequent to the first release signal, the lead processor 116 is further configured to transmit a second release signal to the remote processor 118 (over the wireless link 128) to switch the remote braking system 113 from the application state to the release state. As illustrated in FIG. 1, subsequent to receiving the second release signal from the lead processor 116, the remote processor 118 determines whether the measured pressure within the brake pipe 110 adjacent to the remote powered unit 108 has increased from the application value, such as 64 PSIG, for example. If the pressure within the brake pipe 110 has increased from the application value, the remote processor 118 transmits one or more of: a remote valve signal to the brake processor 140 of the remote powered unit 108 to move the brake valve 136 from the closed position to an open position; and/or a remote handle signal to the brake processor 140 of the remote powered unit 108 to switch the brake handle 132 from the suppression position to a release position. Subsequent to the brake processor 140 moving the brake valve 136 to the open position and switching the brake handle 132 to the release position, the braking system 113 of the remote powered unit 108 is switched from the application state to the release state, to permit an increase in the pressure in the brake pipe 110.

FIG. 2 illustrates one embodiment of a method 200 for reducing a penalty period of the vehicle 101. The steps of the method 200 involve similar steps to those discussed in the embodiments of FIG. 1 above. As previously stated, upon the occurrence of a penalty circumstance, the braking systems 111, 113 of the distributed power train 101 are switched to the application state, at 201. Additionally, as discussed above, the brake handle 130,132 or brake valve handle (BVH) is switched to the suppression position, at 202. The lead processor 116 then monitors the measured pressure within the brake pipe 110, to determine if it is less than 64 PSIG, and also monitors the measured speed of the distributed power train 101, to determine if is at zero or approaching zero, at 204. Additionally, the lead processor 116 determines whether the lead brake handle 130 is still in the suppression position, at 204. If all of these criteria are true, the method 200 involves a 5 second pause by the lead processor 116 and a verification that the remote brake handle 132 is in the suppression position, at 206. If all of the criteria are not true, the method 200 initiates a 2-minute timer, at 208, during which the pressure and speed are constantly compared with the above thresholds, and the lead brake handle 130 is checked as to whether it is in the suppression position. If, after the 2-minute period, the pressure and speed don't comply with the above thresholds (see 210), the method 200 continues to distinct steps for the lead powered unit 106 and the remote powered unit 108, at 212. The lead powered unit 106 transmits a signal to the brake processor 138, and awaits a response, to determine whether any functional failure exists in the braking system 111 (or EAB: electronic air brake), at 214. If a functional failure in the braking system 111 exists, such as through a lack of a response from the brake processor 138 to the signal transmitted from the lead powered unit 106, the distributed power train 101 remains in the penalty phase, at 218. If no failures in the braking system 111 are detected, the lead processor 116 (or lead DPC: lead distributive power computer) moves the brake valve 134 from the closed position to the open position (or clears a penalty bit), and transmits an output to the display 120 to prompt an operator of the lead powered unit 106 to switch the brake handle 130 from the suppression position to the release position, at 216, after which the lead processor 116 checks that the brake handle 130 has been moved from the suppression position to the release position, at 220. If the brake handle 130 is not in the release position, the method 200 continues to check the brake handle 130 until it is in the release position. The lead processor 116 then sends the first release signal (discussed above) to the brake processor 138 to release the braking system 111, and sends the second release signal to the remote processor 118, at 222. Upon receiving the second release signal, the remote processor 118 (or remote DPC: remote distributive power computer) moves the brake valve 136 from the closed position to the open position, switches the brake handle 132 to the release position, and releases the braking system 113, at 224.

FIG. 3 illustrates a flowchart depicting an exemplary embodiment of a method 300 for reducing a penalty period for the distributed power train 101. The method 300 includes measuring 302 one or more parameters related to the operation of the braking system 111, 113. (This may include parameters related directly to braking system operation, e.g., brake fluid pressure, and parameters relating to the effects of the braking system on the train or powered unit(s), such as train speed or acceleration levels, dynamic braking power output, or the like.) The method 300 further includes monitoring 304 the measured parameter(s) subsequent to the commencement of the penalty period. The method 300 further includes determining 306 whether the measured parameter(s) is within a respective predetermined safety range. The method 300 further includes switching 308 the braking system 111, 113 from the application state into a release state to reduce the penalty period based on the measured parameter(s) being within the respective predetermined safety range, before ending at 309.

Certain embodiments may be applicable to distributed power vehicle systems generally, meaning two or more powered vehicles that are linked together and controlled in concert to pull or otherwise move one or more non-powered load vehicles.

While various embodiments of the presently described inventive subject matter have been shown and described herein, it will be obvious that such embodiments are provided by way of example only. Numerous variations, changes and substitutions may be made without departing from the inventive subject matter described herein. For example, the method and system described herein may be applied to any transportation system comprising members interconnected by a fluidic brake pipe such as a train, a semi-truck with trailers, etc. Accordingly, it is intended that the inventive subject matter be limited only by the spirit and scope of the appended claims.

What is claimed is:

1. A system comprising:
   at least one sensor for measuring a movement parameter indicative of whether a vehicle system has stopped moving or continues to move, the vehicle system having one or more powered vehicles and a first braking system that switches into an application state when a penalty period commences; and
   one or more control processors for communicating with the at least one sensor, the one or more control processors monitoring the movement parameter and reducing a duration of the penalty period prior to expiration of the penalty period by switching the first braking system from the application state into a release state during the penalty period responsive to the movement parameter being within a predetermined range indicative of the vehicle system having stopped movement.

2. The system of claim 1, wherein the at least one sensor is a fluid pressure sensor for measuring a pressure of the first braking system as the movement parameter.

3. The system of claim 1 wherein the at least one sensor is a speed sensor for measuring a speed of the vehicle system as the movement parameter.

4. The system of claim 1, wherein the vehicle system includes a display communicatively coupled to the one or more control processors for displaying a prompt to an operator of the vehicle system to switch the first braking system from the application state to the release state.

5. The system of claim 1, further comprising one or more remote processors for communicating with the one or more control processors and being positioned within a remote vehicle of the vehicle system that includes a second braking system, and wherein the one or more remote processors automatically engages the second braking system at commencement of the penalty period and to automatically disengage the second braking system when the one or more control processors switches the first braking system to the release state.

6. A system comprising:
   at least one sensor for measuring a parameter indicative of movement of a vehicle system having one or more powered vehicles and a first braking system that switches into an application state when a penalty period commences; and
   a control processor for communicating with the at least one sensor to monitor the parameter indicative of movement of the vehicle system and to reduce a duration of the penalty period by switching the first braking system from the application state into a release state based on the parameter being within a predetermined range prior to expiration of the penalty period, wherein the control processor is configured to pause for a predetermined lead time before switching the first braking system from the application state into the release state after determining that the parameter that is indicative of movement is within the predetermined range, the predetermined lead time being greater than a time required for fluid pressure in the first braking system to fall within a designated range.

7. The system of claim 6, wherein the control processor is configured to verify that the control processor can communicate with one or more remote processors disposed on one or more other vehicles of the vehicle system over a communication link after expiration of the predetermined lead time.

8. The system of claim 6, wherein the vehicle system is a train and the one or more powered vehicles include one or more locomotives.

9. A system comprising:
a braking system of a vehicle system having one or more powered vehicles, the braking system switching into an application state upon commencement of a penalty period to slow or stop movement of the vehicle system; and
at least one sensor measuring a movement parameter indicative of whether the vehicle system is moving or has stopped moving, wherein subsequent to commencement of the penalty period, the braking system reduces a duration of the penalty period by switching from the application state to a release state responsive to the movement parameter being within a predetermined range that is indicative of stoppage of movement of the vehicle system.

10. The system of claim 9, further comprising:
one or more control processors that monitor the movement parameter after the commencement of the penalty period, the one or more control processors switching the braking system from the application state to the release state responsive to the movement parameter being within the predetermined range.

11. The system of claim 9, further comprising:
one or more remote processors communicatively coupled with the one or more control processors;
wherein the braking system includes a vehicle braking system that is distributed among a plurality of the vehicles in the vehicle system, the vehicle braking system, comprising:
a brake handle;
a brake valve; and
one or more brake processors coupled to the brake handle and the brake valve, one or more brake processors configured to move the brake handle to a suppression position and to switch the brake valve to a closed position after the commencement of the penalty period.

12. A system comprising:
a braking system configured to be disposed on a vehicle system having one or more powered vehicles, the braking system configured to switch into an application state upon commencement of a penalty period to slow or stop movement of the vehicle system;
at least one sensor configured to be communicatively coupled with the braking system, the at least one sensor configured to measure a parameter indicative of movement of the vehicle system, wherein subsequent to commencement of the penalty period, the braking system is configured to reduce a duration of the penalty period by switching from the application state to a release state based on the parameter being within a predetermined range
a remote processor configured to be positioned within at least one of the vehicles in the vehicle system, the remote processor and the control processor configured to be communicatively coupled with each other;
wherein the braking system includes a vehicle braking system that is distributed among a plurality of the vehicles in the vehicle system, the vehicle braking system comprising:
a brake handle;
a brake valve; and
a brake processor coupled to the brake handle and the brake valve, the brake processor configured to move the brake handle to a suppression position and to switch the brake valve to a closed position after the commencement of the penalty period
wherein the movement parameter includes at least one of a measured pressure of fluid within the braking system or a measured speed of the vehicle system;
and wherein the control processor pauses for a predetermined lead time after determining that the parameter is within the predetermined range, the predetermined lead time being greater than a time required for the pressure of the braking system to reach the predetermined range.

13. The system of claim 11, wherein the movement parameter includes at least one of a measured pressure of fluid within the braking system or a measured speed of the vehicle system;
and wherein, subsequent to the one or more control processors determining that the parameter is within the predetermined range, the one or more control processors transmitting:
a lead valve signal to the one or more brake processors of at least one of the vehicle braking systems to move the brake valve from the closed position to an open position;
a lead handle signal to the one or more brake processors of at least one of the vehicle braking systems to switch the brake handle from the suppression position to a release position; and
a first release signal to the one or more brake processors of at least one of the vehicle braking systems such that the at least one of the vehicle braking systems switches from the application state to the release state to initiate an increase in the pressure within the braking system.

14. The system of claim 9, wherein the at least one sensor is a speed sensor that measures a speed of movement of the vehicle system as the movement parameter.

15. The system of claim 9, wherein the at least one sensor is a pressure sensor that measures a fluid pressure in the braking system as the movement parameter.

16. The system of claim 9, wherein the vehicle system is a train and the one or more powered vehicles include one or more locomotives.

17. A system comprising:
one or more processors for monitoring a movement parameter indicative of movement of a vehicle system having one or more powered vehicles, the one or more processors changing a duration of a predetermined penalty period following application of a braking system of the vehicle system responsive to a change in the movement parameter after the penalty period begins, wherein the braking system is prevented from being released during the penalty period and the change in the movement parameter represents that movement of the vehicle system has stopped.

18. The system of claim 17, wherein the one or more processors terminate the penalty period to allow release of the braking system when fluid pressure of the braking system rises above a predetermined value.

19. The system of claim 17, wherein the one or more processors terminate the penalty period to allow release of the braking system when a speed of the movement of the vehicle system falls below a predetermined value.

20. The system of claim 17, wherein the one or more processors shorten the duration of the penalty period based on the change in the movement parameter.

* * * * *